United States Patent [19]
Rak et al.

[11] Patent Number: 5,826,765
[45] Date of Patent: Oct. 27, 1998

[54] LOAD BAR FOR AUTOMOBILE LUGGAGE CARRIER

[75] Inventors: Artur K. Rak, Rochester Hills; John S. Cucheran, Lake Orion, both of Mich.

[73] Assignee: JAC Products, Inc., Ann Arbor, Mich.

[21] Appl. No.: 881,598

[22] Filed: Jul. 9, 1997

Related U.S. Application Data

[63] Continuation-in-part of Ser. No. 622,589, Jun. 12, 1996, abandoned.

[51] Int. Cl.$^6$ .................................................. B60R 9/00
[52] U.S. Cl. .................................... 224/321; 224/326
[58] Field of Search .................... 224/315, 319, 224/320, 321, 322, 323, 324, 325, 326

[56] References Cited

U.S. PATENT DOCUMENTS 4,799,819   1/1989   Swoboda ................................ 403/252

*Primary Examiner*—Robert M. Fetsuga
*Assistant Examiner*—Timothy L. Maust
*Attorney, Agent, or Firm*—Harness, Dickey & Pierce, PLC

[57] ABSTRACT

A vehicle article carrier having a pair of bracket members lockably engageable with a pair of slats, wherein each of the bracket members has a rotatable thumb wheel, a locking member and a spreader block disposed within the locking member. The locking member is threadably engaged with a threaded shaft fixedly secured to the thumb wheel such that rotational movement of the thumb wheel in a locking direction linearly displaces the locking member. A spreader block having a pair of tapered walls causes a pair of arm portions of the locking member to be cammingly spread apart as the locking member is linearly displaced such that the arm portions engage within a channel of the slat to cause the bracket member to be clampingly engaged with the slat. The spreader block allows the arm portions to be retracted when the thumb wheel is rotated in an unlocking direction such that the entire bracket member can be removed from the slat without any disassembly.

22 Claims, 3 Drawing Sheets

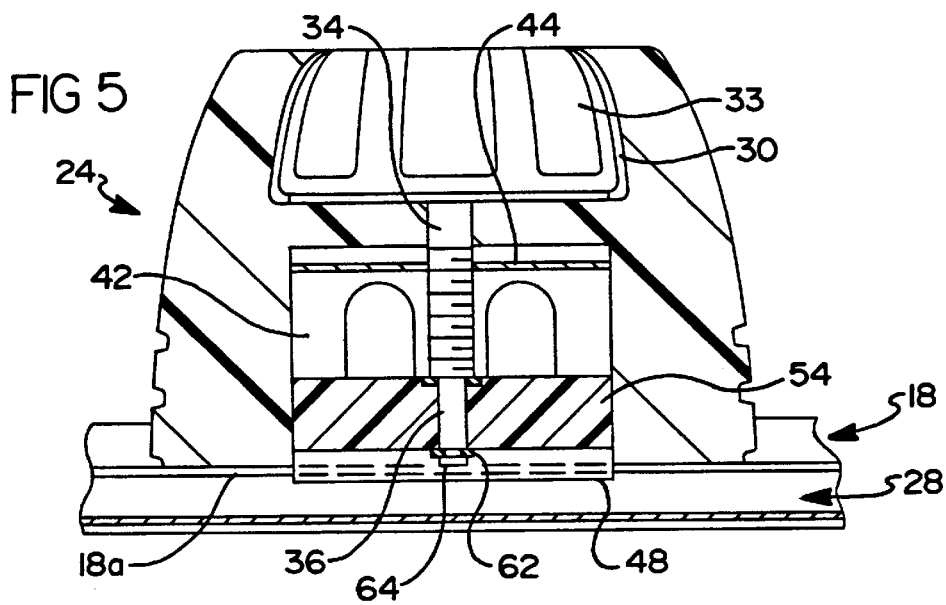
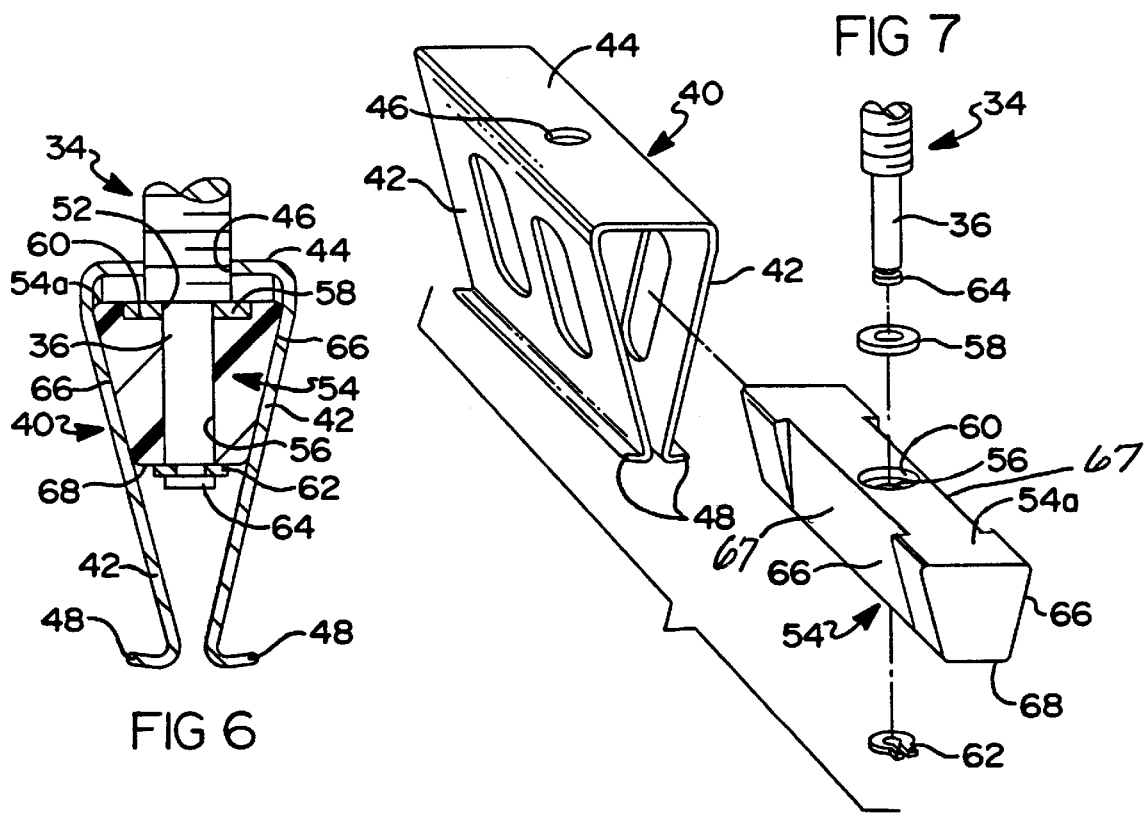

LOAD BAR FOR AUTOMOBILE LUGGAGE CARRIER

CROSS REFERENCE TO RELATED APPLICATIONS

This is a continuation-in-part of U.S. Ser. No. 08/662,589 filed Jun. 12, 1996, now abandoned.

TECHNICAL FIELD

This invention relates to vehicle article carriers, and more particularly to a vehicle article carrier having a pair of bracket members which each include a locking assembly which allows its associated bracket member to be quickly and easily placed in locking engagement with an associated slat through a camming action and with a minimum number of moving parts.

DISCUSSION

Vehicle article carriers are used in a wide variety of applications to support various forms of articles above an outer body surface of the vehicle when such articles need to be transported and are of dimensions which do not permit the articles to be placed within an interior area of the vehicle. Such article carriers typically include a pair of slats which are secured to an outer body surface of the vehicle, a cross bar for supporting the articles above the outer body surface of the vehicle, and a pair of bracket members for supporting the cross bar elevationally above each of the slats. The bracket members incorporate various forms of locking mechanisms for securing each bracket member to its associated slat, which may or may not allow the cross bar to be adjustably positioned.

With some article carrier designs, some degree of disassembly of the bracket member has been necessary before the bracket member can be completely removed from its associated slat. Other designs of locking assemblies have permitted removal of the bracket member without disassembly, but have required somewhat complex locking assemblies with a fair number of moving parts to allow the bracket member to be quickly and easily removed from the slat without any disassembly beforehand. Still other forms of locking assemblies require special wrenches or other tools to unlock the bracket member from its associated slat before the bracket member can be removed from the slat.

It would therefore be highly desirable to have a vehicle article carrier which incorporates a bracket member which does not require any disassembly for the bracket member to be removed from an associated slat.

It would further be highly desirable to have a vehicle article carrier which includes a bracket member having a locking assembly which is of relatively simple construction, yet which effectively enables the bracket member to be quickly and easily locked to an associated slat as well as unlocked from the slat and physically removed from the slat without any disassembly steps being required before removal.

It would still be highly desirable to provide a vehicle article carrier having a pair of bracket members which each include a locking assembly having a small number of moving parts which allows the bracket member to be quickly and easily removed from an associated slat when the locking assembly is in an unlocked position, and which is relatively inexpensive and does not require complicated assembly procedures for its manufacture or special wrenches, tools, etc. for securing the bracket member to its associated slat.

SUMMARY OF THE INVENTION

The above and other objects are provided by a vehicle article carrier in accordance with preferred embodiments of the present invention. In one preferred embodiment the vehicle article carrier incorporates a pair of slats which are fixedly secured to an outer body surface of a vehicle, where each slat includes a channel. A cross bar having a pair of bracket members secured thereto is supported elevationally above the outer body surface by the bracket members, which each rest on a surface of an associated one of the slats. Each bracket member includes an actuating member, a locking member and a spreader member. The actuating member includes an elongated, threaded shaft which is threadably engaged with a portion of the locking member. The spreader member is positioned within the locking member and secured to the threaded shaft so as to remain generally stationary (i.e., non-rotating) within the bracket member at all times.

The actuating member is manually rotatable and disposed within a recess in its associated bracket member so as to project outwardly therefrom and therefore be readily engageable with one or more fingers. As the actuating member is rotated in an unlocking direction, the threaded shaft causes the locking member to be linearly displaced within an interior cavity of the bracket member in a first direction. As the locking member is linearly displaced, the spreader member cammingly urges a pair of arm portions of the locking member outwardly into engagement with the channel of its associated slat as the locking member is displaced vertically. When the actuating member is rotated in an unlocking direction, the locking member is displaced linearly in a second direction opposite to the first direction, which allows the arm portions to be retracted toward one another and out of engagement with the channel. In the unlocked position the bracket member may be lifted completely off of its associated slat for removal when needed without any disassembly of any portion of the bracket member. When in the locked position, the bracket member is secured abuttingly against its associated slat by the arm portions of the locking member which, in this position, are placed under tension.

In the preferred embodiments, the arm portions are urged outwardly away from one another as the actuating member is rotated in the unlocking direction. Each arm portion includes a hook portion which is adapted to engage with a lip portion of the channel of its associated slat as the actuating member is rotated in its unlocking direction. The spreader member comprises a spreader block having a pair of tapered wall portions which converge at a lower end of the spreader block. The arm portions are caused to be "spread out" or cammingly urged outwardly away from one another by the tapered walls as the entire locking member is displaced linearly when the actuating member is rotated in its locking direction.

The preferred embodiments of the present invention provide a simple yet effective locking assembly for use with a bracket member of a vehicle article carrier which permits the bracket member to be completely removed from its associated slat when the locking member is in its unlocked position. No disassembly or special tools are required before the bracket member can be completely lifted off of its associated slat. Furthermore, only a minimum number of moving parts are required to accomplish the above-described locking action.

BRIEF DESCRIPTION OF THE DRAWINGS

FIG. 5 is a cross sectional side view in accordance with section line 5—5 in FIG. 3 showing the bracket member in its locked position;

FIG. 6 is an enlarged view of circled area 6 in FIG. 4; and

FIG. 7 is an exploded perspective view of the locking member and spreader block.

DETAILED DESCRIPTION OF THE PREFERRED EMBODIMENTS

Figure 1:
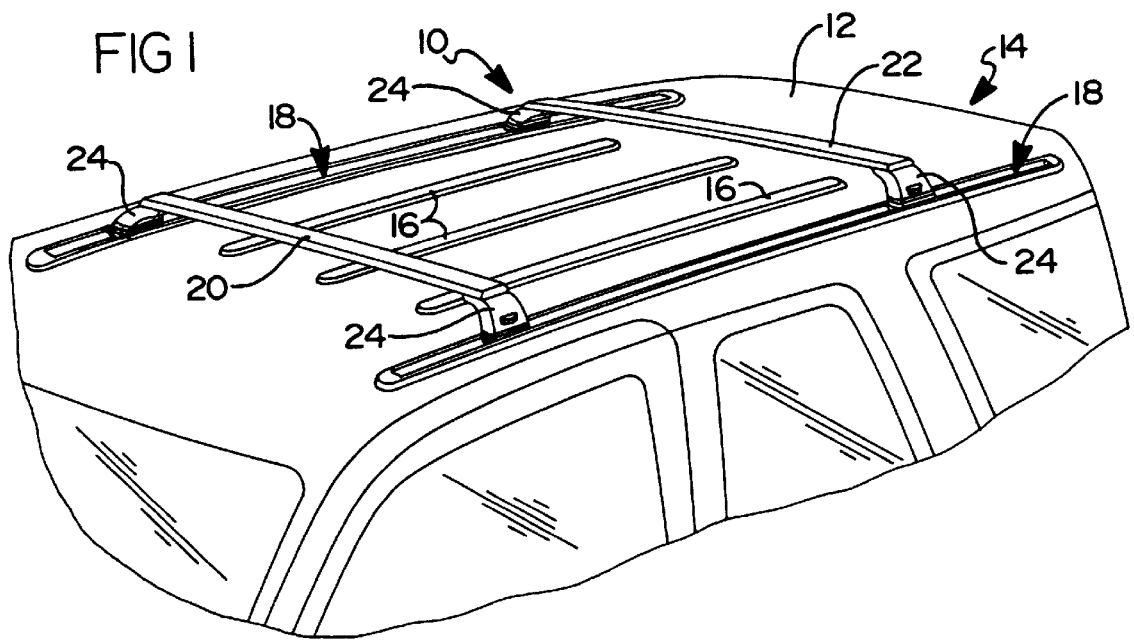
FIG. 1 is a perspective view of a vehicle incorporating a vehicle article carrier in accordance with preferred embodiments of the present invention.

Referring to FIG. 1, there is shown a vehicle article carrier 10 in accordance with a preferred embodiment of the present invention secured to an outer body surface 12 of a vehicle 14. Also illustrated is a plurality of intermediate slats 16 which are optional but which are preferably included with the vehicle article carrier 10 in most applications.

Vehicle article carrier 10 generally includes a pair of slats 18 fixedly secured to the outer body surface 12 by conventional fastening elements so as to extend generally parallel from one another along the major length of the outer body surface 12. A moveable front cross bar 20 and a rear moveable cross bar 22 are supported elevationally above the slats 18 by bracket members 24. The bracket members 24 are fixedly secured to outer most ends of each of the cross bars 20 and 22 such that articles supported on the cross bars 20 and 22 are held above the outer body surface 12. It will be appreciated immediately, however, that one of the moveable cross bars 20 and 22 could instead be a non-moveable cross bar which is fixedly secured to the slats 18 during assembly of the article carrier 10 to the vehicle 14. It is anticipated that in most applications, however, that two moveable cross bars will be preferred over a single moveable cross bar.

Figure 2:
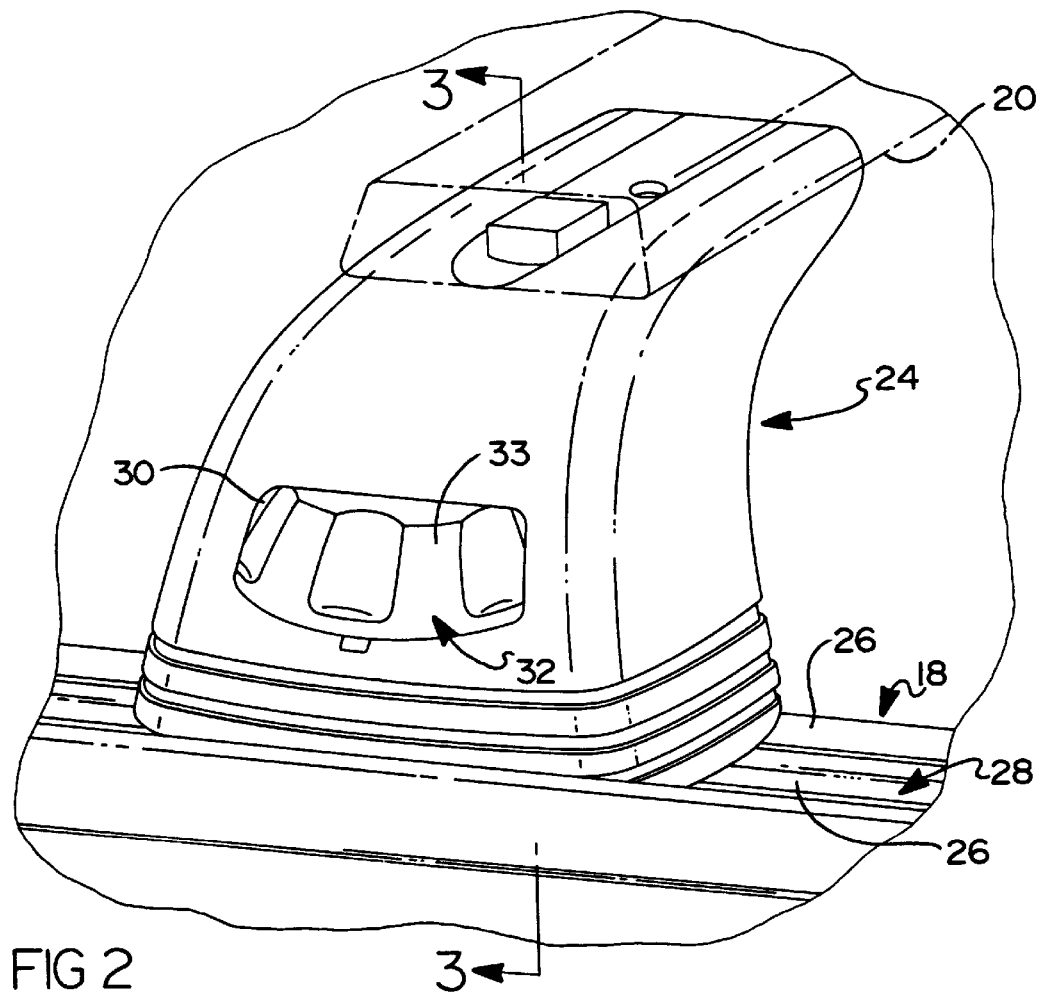
FIG. 2 is a perspective, enlarged view of one of the bracket members.

Referring to FIG. 2, it can be seen that each bracket member 24 rests on an outer, article supporting surface 26 of its associated slat 18. Each slat 18 further includes a channel 28 preferably extending along a major portion of the length of the slat 18. The slat 18 is shown as a roll-formed slat, but could be extruded or assembled from several independent components to provide a supporting member having a channel and being suitable in strength to support articles thereon.

Figure 3:
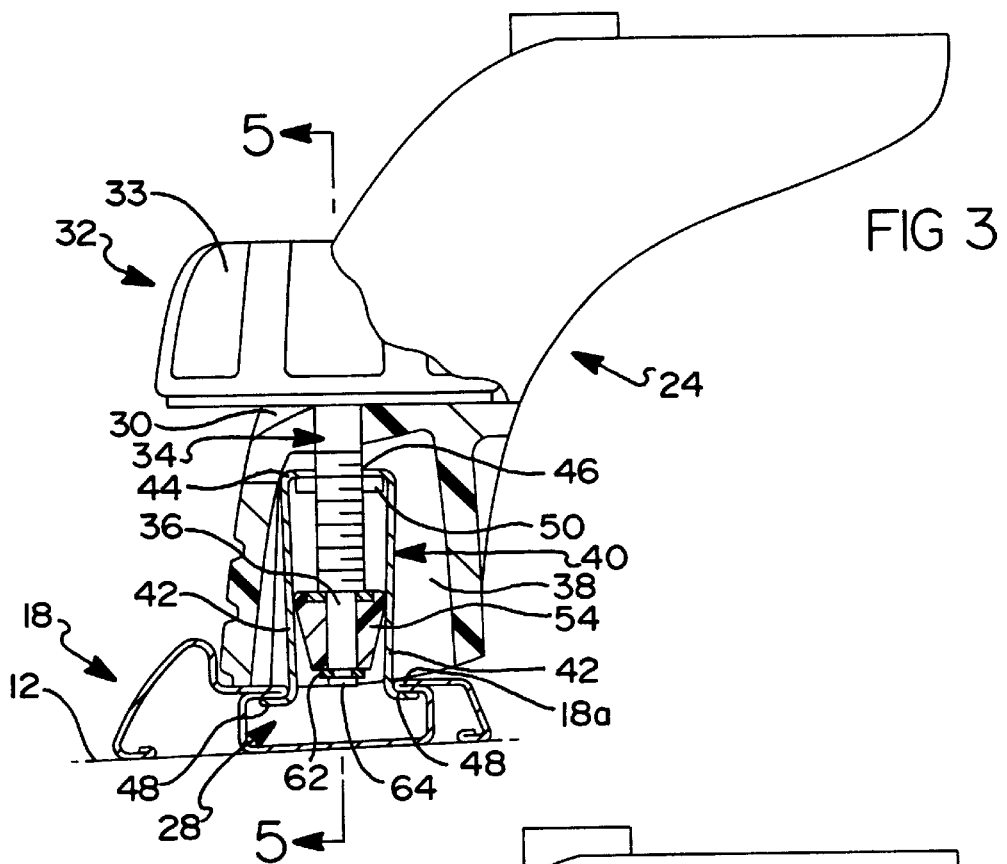
FIG. 3 is a side cross sectional view in accordance with section line 3—3 in FIG. 2 showing the bracket member in its locked position.

The bracket member 24 includes an opening 30 in which is positioned an actuating member 32. With reference to FIGS. 2 and 3, the actuating member 32 is comprised of a generally circular thumb wheel 33 which is manually engageable with one or more fingers of a hand and rotatable within the bracket member 24 in locking and unlocking directions. With specific reference to FIG. 3, the actuating member 32 also includes an elongated, threaded shaft 34 having a non-threaded lower end portion 36. The shaft 34 extends through an opening 38 in the bracket member 24 which is in communication with the opening 30. The thumb wheel 33 is fixedly secured to the shaft 34 such that rotation of the thumb wheel 33 causes concurrent rotation of the shaft 34.

With further reference to FIGS. 3, 6 and 7, the article carrier 10 includes an inverted, U-shaped locking member 40 having a pair of resilient arm portions 42 and a base portion 44. The base portion 44 includes a threaded aperture 46 which is threadably engaged with the threaded portion of the shaft 34. The arm portions 42 each include a hook portion 48 which project away from one another generally parallel to the outer body surface 12. A washer 50 is secured to the base portion 44 by brazing, adhesives or any other conventional manner to further stiffen the base portion 44 and also includes an aperture 52, as indicated particularly well in FIG. 6.

With further reference to FIGS. 3, 6 and 7, a spreader block 54 having a bore 56 is positioned at the non-threaded lower end portion 36 of the shaft 34. The spreader block 54 may be made from a wide variety of materials but in the preferred embodiments is manufactured from plastic to form a solid block which is not readily compressible or deformable. The spreader block 54 includes a metal washer 58 positioned within a recess 60. The washer 58 provides a surface which is more wear-resistant than the plastic material from which the spreader block 54 is manufactured. The spreader block 54 is secured to the shaft 34 via a C-ring 62 (FIGS. 3 and 4) secured to a lower most end portion 64 of the shaft 34. Accordingly, the spacer block 54 is held relatively stationary within the arm portions 42 of the locking member 40 regardless of rotational movement of the thumb wheel 33.

As seen particularly well in FIGS. 6 and 7, the spreader block 54 also includes tapered wall portions 66 which converge at a lower end 68 of the spreader block. The outer dimensions of the spreader block are just slightly less than the inner dimensions of the locking member such that during assembly, the spreader block 54 can be slidably inserted into the locking member 40 such that the aperture 46 and the bore 56 are vertically aligned and ready to accept the shaft 34. The spreader block 54 also includes a notched area 67 on opposites sides thereof. The notched areas 67 limit the area of each of the wall portions 66 which is in contact with the locking member 40. This serves to ease slightly the sliding action between the spreader block 54 and the locking member 40.

Referring again to FIG. 2, when the thumb wheel 33 is rotated in a locking direction, the entire locking member 40 is linearly displaced upwardly in the drawing of FIG. 2 by the threaded engagement with the shaft 34. Since the spreader block 54 remains essentially stationary, this causes the arm portions 42 to be urged outwardly away from one another by the tapered walls 66 of the spreader block 54 as the locking member 40 is lifted. As the arm portions 42 are urged outwardly they engage ledge portions 18a of the slat 18, as indicated in FIG. 2. When in the fully locked position shown in FIG. 3, the bracket member 24 is held clampingly to the slat 18 and cannot be removed or readily slid along the slat 18 without great difficulty.

Figure 4:
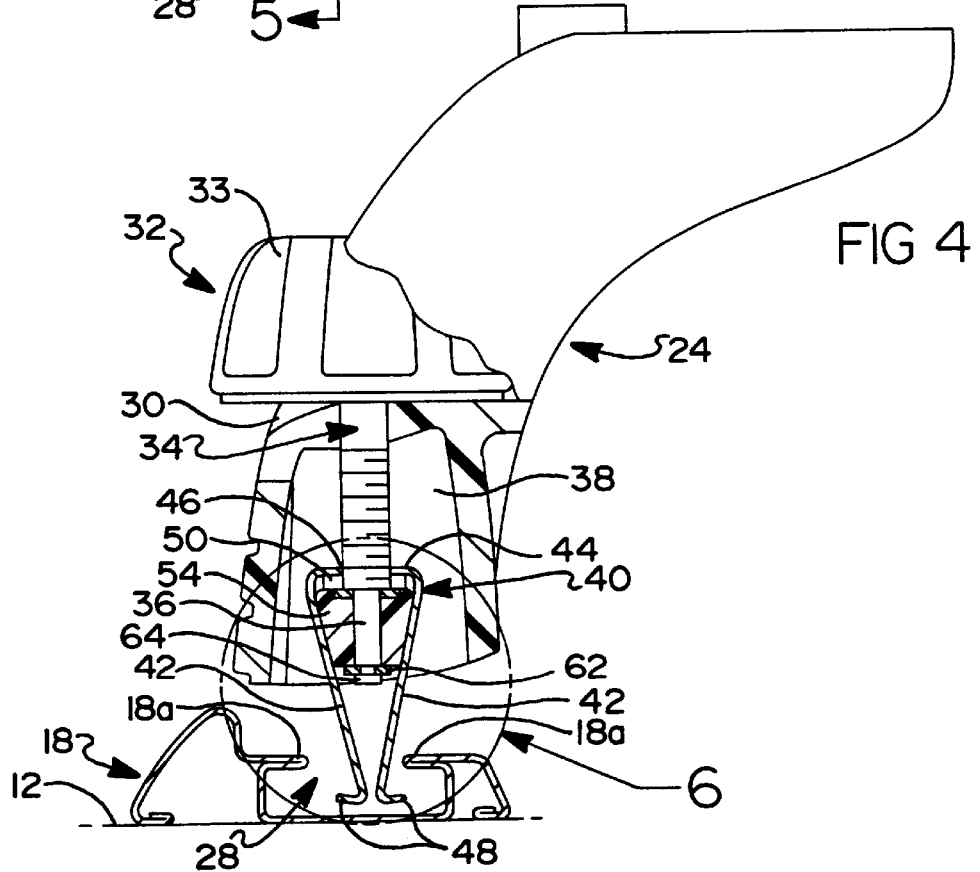
FIG. 4 is a side cross sectional view showing the bracket member in its unlocked position and lifted almost clear of its associated slat.

Referring to FIG. 4, when the thumb wheel 33 is rotated in an unlocking direction into a fully unlocked position, the entire locking member 40 is threadably displaced downwardly until the washer-like member 50 abuttingly contacts the washer 58 and upper surface 54a of the spreader block 54 (FIG. 6). As the locking member 40 is being displaced linearly downwardly, the tapered walls 66 permit the arm portions 42 to be retracted into the position shown in FIG. 4. When in the fully unlocked position, the arm portions are retracted to a degree which permits the hook portions 48 to be completely withdrawn from the channel 28 and the entire bracket 24 removed from its associated slat 18. This removal is further accomplished without the need for disassembly of any portion of the bracket member 24 or the need for any special tools to accomplish removal of the bracket member.

The locking member 40 is preferably constructed from a single piece of metal which imparts a slight degree of resiliency to the arm portions 42.

It will be appreciated that various modifications could easily be made to the vehicle article carrier 10 of the present invention without departing from the scope of the claims. For example, the spreader block 54 could include a threaded bore and the locking member 40 could be disposed within the bracket member 24 such that it is essentially fixed and does not move upon rotation of the thumb wheel 33. In this manner the threaded shaft 34 could be used to linearly move the spreader block 54 downwardly in the drawings of FIGS. 3 and 4 to cause the arm portions 42 to be spread apart. Additionally, notches could also be included in the ledge portions 18a of the article supporting surfaces 26 of the slat 18 to allow the hook portions 48 of the locking member 40 to be even more positively engaged with the slat 18 when the thumb wheel 33 is rotated into its fully locked position.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier for supporting articles elevationally above an outer body surface of the vehicle, said vehicle article carrier comprising:
   a pair of slats positioned generally parallel to one another and adapted to be fixedly secured to said outer body surface of said vehicle, each said slat having a channel extending at least a portion of the length thereof;
   a cross bar having a length sufficient to span between said slats when said slats are adapted to be fixedly secured to said outer body vehicle surface;
   a pair of bracket members secured to said cross bar to support said cross bar above said outer body surface;
   each said bracket member including:
      a manually rotatable actuating member;
      a locking member operably associated with said actuating member for movement generally linearly towards and away from said outer body surface of said vehicle as said actuating member is rotated in unlocking and locking directions, respectively; said locking member including a pair of flexible arm portions;
      a spreader member positioned between said arm portions of said locking member and disposed within said bracket member so as to be maintained generally stationary when said actuating member is rotated in said locking and unlocking directions, said spreader member operating to cammingly urge said arm portions apart from one another as said locking member is caused to be moved generally linearly by rotation of said actuating member in said locking direction, and allowing said arm portions to return to a position closely adjacent one another as said locking member is moved linearly in response to rotation of said actuating member in said unlocking direction.

2. The vehicle article carrier of claim 1, wherein said locking member comprises an inverted U-shaped member having a base portion integrally formed with said arm portions;
   wherein said actuating member includes a threaded shaft; and
   said base portion including a threaded aperture for threadably receiving a portion of said threaded shaft of said actuating member.

3. The vehicle article carrier of claim 1, wherein said actuating member comprises:
   a manually engageable wheel disposed partially within said bracket member so as to project outwardly of an outer surface of said bracket member so as to be manually engageable with one or more fingers;
   a threaded, elongated shaft fixedly secured to said actuating member and extending towards said outer body surface of said vehicle when said actuating member is installed in said bracket member.

4. The vehicle article carrier of claim 1, wherein said spreader member comprises a spreader block having a pair of tapered walls converging toward one another and a bore extending therethrough.

5. The vehicle article carrier of claim 2, wherein said arm portions of said locking member each have a hook portion flaring outwardly away from one another and adapted to engage within said channel of an associated one of said slats when said actuating member is rotated in said locked direction.

6. The vehicle article carrier of claim 1, wherein:
   said actuating member includes a manually engageable thumb wheel disposed within said bracket member so as to project outwardly of an outer surface of said bracket member; and
   an elongated, threaded shaft fixedly secured to said thumb wheel member so as to extend towards said outer body surface of said vehicle; and
   wherein said locking member includes a threaded aperture for receiving said elongated, threaded shaft to enable said locking member to be moved linearly away from said outer body surface when said thumb wheel member is rotated in said locked direction.

7. The vehicle article carrier of claim 6, wherein said locking member comprises an inverted U-shaped member.

8. A vehicle article carrier for supporting articles elevationally above an outer body surface of the vehicle, said vehicle article carrier comprising:
   a pair of elongated slats adapted to be fixedly secured to said outer body surface and extending generally parallel to one another along said outer body surface, each one of said slats including a channel formed therein extending along at least a portion of the length of each said slat;
   a cross bar;
   a pair of bracket members secured to said cross bar to support said cross bar elevationally above said outer body surface;
   each said bracket member including:
      a manually rotatable actuating member, said actuating member including an elongated, threaded shaft;
      a spreader block; and
      a locking member disposed over said spreader block, said locking member including a pair of resilient arm portions and a base portion including a threaded aperture for receiving said elongated, threaded shaft;
   said arm portions being deflectable away from one another by said spreader block so as to engage within said channel as said locking member is urged linearly away from said outer body surface as said actuating member is rotated in said locked direction.

9. The vehicle article carrier of claim 8, wherein said spreader block includes tapered side walls which converge towards a lower end of said spreader block and a bore.

10. The vehicle article carrier of claim 9, wherein:

said elongated, threaded shaft of said actuating member includes a non-threaded portion sufficient in length to extend completely through said bore of said spreader block.

11. The vehicle article carrier of claim 9, wherein said arm portions of said locking member include a pair of hook portions projecting generally away from one another at a lower end portion of each one of said arm portions, said hook portions serving to engage within said channel when said actuating member is rotated into said locked position.

12. The vehicle article carrier of claim 9, wherein said spreader block further comprises a notch formed on opposite sides thereof to ease sliding movement along said locking member.

13. A vehicle article carrier for supporting articles elevationally above an outer body surface of a vehicle, said vehicle article carrier comprising:

a pair of slats adapted to be fixedly secured to said outer body surface generally parallel to one another, each of said slats including a channel;

a cross bar;

a pair of bracket members for supporting said cross bar elevationally above said outer body surface;

each said bracket member including a manually engageable actuating member protruding from an outer surface of said bracket member and including an elongated, threaded shaft extending within an interior area of said bracket member, said actuating member being manually rotatable between locked and unlocked positions;

a locking member having a pair of resilient arm portions each of a length sufficient to extend within said channel of an associated one of said slats when said bracket member is positioned on said one slat; and a spreader member operably associated with said actuating member and said locking member, and cooperating with said actuating member to cammingly urge said arm portions of said locking member into engagement with said channel when said actuating member is rotated into said locked position and to permit said arm portions to be retracted out of locking engagement within said channel when said actuating member is rotated into said unlocked position.

14. The vehicle article carrier of claim 13, wherein said elongated, threaded shaft operates to draw said locking member generally linearly away from said outer body surface when said actuating member is rotated into said locked position.

15. The vehicle article carrier of claim 13, wherein said locking member is caused to be moved linearly towards said outer body surface when said actuating member is rotated in said unlocked position.

16. The vehicle article carrier of claim 13, wherein said spreader member is secured to a non-threaded portion of said elongated, threaded shaft so as to remain generally stationary within said bracket member when said actuating member is rotated into said locked and unlocked positions.

17. The vehicle article carrier of claim 13, wherein said spreader member is positioned within said locking member;

wherein said spreader member includes a pair of tapered side walls converging at a lower end of said spreader member; and wherein said tapered walls of said spreader member operate to cammingly urge said arm portions of said locking member outwardly away from one another in response to rotational movement of said actuating member into said locked position.

18. The vehicle article carrier of claim 17, wherein said locking member includes a base portion having a threaded aperture; and wherein said elongated, threaded shaft is threadably engaged with said threaded aperture; and wherein movement of said actuating member in said locked direction causes said locking member to be displaced linearly in a plane generally perpendicular to said outer body surface, thus causing said arm portions to be urged outwardly away from one another into engagement with said channel.

19. A vehicle article carrier for supporting articles elevationally above an outer body surface of a vehicle, said vehicle article carrier comprising:

a pair of slats each having a channel and adapted to be secured to said outer body surface of said vehicle generally parallel to one another;

a cross bar;

a pair of bracket members for supporting said cross bar elevationally above said outer body surface;

each of said bracket members including:

a recess communicating with an interior cavity;

an actuating member having a manually engageable thumb wheel positioned within said recess and a perpendicularly extending elongated, threaded shaft fixedly secured to said thumb wheel so as to be rotatable in accordance with rotation of said thumb wheel in locked and unlocked directions;

a spreader block secured to a non-threaded lower end of said threaded shaft so as not to be moveable rotationally with said threaded shaft;

a locking member disposed in close, abutting relationship with said spreader block, said locking member having a pair of arm portions extending toward said outer body surface when said bracket member is positioned on said slat; and said locking member being threadably engaged with said threaded shaft such that rotation of said thumb wheel in said locked direction causes said locking member to be linearly withdrawn within said interior cavity such that said spreader member causes said arm portions to be cammingly urged outwardly away from one another into engagement with said channel, and when said thumb wheel is rotated in said unlocked direction said locking member is linearly displaced towards said outer body surface, whereby said spreader block enables said arm portions to retract toward one another such that said bracket member can be completely removed from said slat without disassembly when said thumb wheel is rotated in said unlocked direction.

20. The vehicle article carrier of claim 19, wherein said spreader block includes a pair of tapered wall portions which converge at a lower end of said spreader block.

21. The vehicle article carrier of claim 19, wherein said arm portions include hook portions projecting away from one another which engage with said channel when said actuating member is rotated in said locked direction.

22. A vehicle article carrier for supporting articles elevationally above an outer body surface of the vehicle, said vehicle article carrier comprising:

a pair of slats positioned generally parallel to one another and adapted to be fixedly secured to said outer body surface of said vehicle, each said slat having a channel extending at least a portion of the length thereof;

a cross bar having a length sufficient to span between said slats when said slats are fixedly secured to said outer body vehicle surface;

a pair of bracket members secured to said cross bar to support said cross bar above said outer body surface;

each said bracket member including:

a manually movable actuating member;

a locking member operably associated with said actuating member for movement generally linearly towards and away from said outer body surface of said vehicle if said actuating member is moved in locking and unlocking directions, respectively, said locking member including at least one flexible arm member;

a spreader member positioned adjacent said at least one flexible arm member and disposed within said bracket member;

said spreader member operating to cammingly urge said arm member towards and away from a portion of said slat as said actuating member is moved in locked and unlocked directions, respectively.

* * * * *